(12) United States Patent
Boertjes et al.

(10) Patent No.: US 10,200,145 B2
(45) Date of Patent: *Feb. 5, 2019

(54) FLEXIBLE GRID OPTICAL SPECTRUM TRANSMITTER, RECEIVER, AND TRANSCEIVER

(71) Applicant: Ciena Corporation, Hanover, MD (US)

(72) Inventors: David W. Boertjes, Ottawa (CA); Michel Belanger, Montreal (CA)

(73) Assignee: Ciena Corporation, Hanover, MD (US)

( * ) Notice: Subject to any disclaimer, the term of this patent is extended or adjusted under 35 U.S.C. 154(b) by 28 days.

This patent is subject to a terminal disclaimer.

(21) Appl. No.: 15/371,552

(22) Filed: Dec. 7, 2016

(65) Prior Publication Data

US 2017/0085335 A1 Mar. 23, 2017

Related U.S. Application Data

(63) Continuation of application No. 14/918,108, filed on Oct. 20, 2015, now Pat. No. 9,634,791, which is a (Continued)

(51) Int. Cl.
*H04J 14/02* (2006.01)
*H04Q 11/00* (2006.01)

(52) U.S. Cl.
CPC ...... *H04J 14/0257* (2013.01); *H04J 14/0204* (2013.01); *H04J 14/0206* (2013.01); (Continued)

(58) Field of Classification Search
CPC .. H04J 14/0213; H04J 14/0216; H04J 14/021; H04J 14/0204; H04J 14/0206; (Continued)

(56) References Cited

U.S. PATENT DOCUMENTS 6,580,536 B1 6/2003 Chraplyvy et al.
6,714,702 B2 3/2004 Whiteaway et al.
(Continued)

FOREIGN PATENT DOCUMENTS

WO 2010043035 A1 4/2010

OTHER PUBLICATIONS

Kozicki et al; Distance-adaptive spectrum allocation in SLICE considering optical filtering effects; Jul. 2010; Optoelectronics and comunication conferecne; pp. 98-99.*

(Continued)

*Primary Examiner* — Amritbir K Sandhu
(74) *Attorney, Agent, or Firm* — Clements Bernard Walker PLLC; Christpoher L. Bernard; Lawrence A. Baratta, Jr.

(57) ABSTRACT

A flexible grid optical transceiver communicatively coupled to an optical network includes a coherent optical transmitter configured to generate a transmit signal at a first frequency/wavelength center and spanning a first one or more bins of optical spectrum; and a coherent optical receiver configured to receive a receive signal at a second frequency/wavelength center and spanning a second one or more bins of optical spectrum, wherein a size of each of the first one or more of bins and the second one or more of bins is based on a required roll off of a wavelength selective component in the optical network.

10 Claims, 9 Drawing Sheets

Related U.S. Application Data continuation of application No. 13/218,759, filed on Aug. 26, 2011, now Pat. No. 9,197,354.

(60) Provisional application No. 61/377,290, filed on Aug. 26, 2010.

(52) U.S. Cl.
CPC ...... *H04J 14/0212* (2013.01); *H04J 14/0213* (2013.01); *H04Q 11/0066* (2013.01); *H04J 14/0221* (2013.01); *H04Q 2011/0016* (2013.01); *H04Q 2011/0086* (2013.01)

(58) Field of Classification Search
CPC ............... H04J 14/0212; H04J 14/0221; H04J 14/0257; H04B 10/25036; H04B 10/50; H04B 10/60; H04Q 11/0066; H04Q 2011/0016; H04Q 2011/0086
USPC .................................. 398/48, 68, 69, 72, 79
See application file for complete search history.

(56) References Cited

U.S. PATENT DOCUMENTS

| | | | |
|---|---|---|---|
| 6,859,623 B2 | 2/2005 | Le Boudette et al. | |
| 7,039,270 B2 | 5/2006 | Poti et al. | |
| 7,184,666 B1 | 2/2007 | Li et al. | |
| 7,221,820 B2 | 5/2007 | Boertjes et al. | |
| 7,262,898 B2 | 8/2007 | Marom et al. | |
| 7,269,356 B2 | 9/2007 | Winzer | |
| 7,372,607 B2 | 5/2008 | Marom | |
| 7,734,174 B2 | 6/2010 | Beckett et al. | |
| 7,756,368 B2 | 7/2010 | Garrett et al. | |
| 7,769,255 B2 | 8/2010 | Nagy et al. | |
| 7,831,049 B1 | 11/2010 | Kanter | |
| 8,472,224 B2 | 6/2013 | Elfadel et al. | |
| 8,655,190 B2 | 2/2014 | Wu et al. | |
| 8,666,252 B2 | 3/2014 | Nishihara et al. | |
| 8,873,962 B2 | 10/2014 | Patel et al. | |
| 9,197,354 B2 * | 11/2015 | Boertjes | H04J 14/0204 |
| 9,438,369 B2 * | 9/2016 | Swinkels | H04J 14/0257 |
| 9,634,791 B2 * | 4/2017 | Boertjes | H04J 14/0204 |
| 2002/0105692 A1 | 8/2002 | Lauder et al. | |
| 2002/0106146 A1 * | 8/2002 | Lauder | H04J 14/0209 385/24 |
| 2002/0180957 A1 | 12/2002 | Lauder et al. | |
| 2007/0133086 A1 | 6/2007 | Wilhelm et al. | |
| 2007/0160372 A1 | 7/2007 | Eberlein et al. | |
| 2008/0043789 A1 | 2/2008 | Moro et al. | |
| 2008/0107430 A1 | 5/2008 | Jackel | |
| 2009/0028503 A1 | 1/2009 | Garrett et al. | |
| 2009/0226187 A1 * | 9/2009 | Tanimura | H04B 10/60 398/202 |
| 2010/0046948 A1 | 2/2010 | Chraplyvy et al. | |
| 2010/0098411 A1 * | 4/2010 | Nakashima | H04B 10/60 398/25 |
| 2010/0158531 A1 | 6/2010 | Chung et al. | |
| 2010/0178057 A1 | 7/2010 | Shieh | |
| 2010/0278084 A1 | 11/2010 | Jones et al. | |
| 2011/0019783 A1 | 1/2011 | Nakano et al. | |
| 2011/0026925 A1 | 2/2011 | Mu et al. | |
| 2011/0176815 A1 * | 7/2011 | Frankel | H04B 10/5053 398/184 |
| 2011/0200324 A1 | 8/2011 | Boertjes et al. | |
| 2011/0268442 A1 | 11/2011 | Boertjes et al. | |
| 2011/0286746 A1 * | 11/2011 | Ji | H04J 14/0204 398/83 |
| 2012/0014692 A1 | 1/2012 | Kim et al. | |
| 2012/0114332 A1 | 5/2012 | Zhang et al. | |
| 2012/0128347 A1 | 5/2012 | Sakamoto et al. | |
| 2012/0189311 A1 * | 7/2012 | Buchali | H04J 14/02 398/85 |
| 2012/0195592 A1 | 8/2012 | Barnard et al. | |
| 2012/0213517 A1 | 8/2012 | Ji et al. | |
| 2012/0251117 A1 * | 10/2012 | Patel | H04J 14/0224 398/79 |
| 2012/0251119 A1 | 10/2012 | McNicol et al. | |
| 2012/0251120 A1 * | 10/2012 | McNicol | H04B 10/506 398/91 |
| 2012/0251121 A1 * | 10/2012 | McNicol | H04J 14/02 398/91 |
| 2012/0328291 A1 | 12/2012 | Frisken et al. | |
| 2012/0328296 A1 | 12/2012 | Sullivan et al. | |
| 2013/0011138 A1 | 1/2013 | Kim et al. | |
| 2013/0022355 A1 | 1/2013 | Charlet et al. | |
| 2013/0315580 A1 * | 11/2013 | Boertjes | H04J 14/0204 398/5 |
| 2014/0126903 A1 | 4/2014 | Kaneoka et al. | |
| 2014/0169802 A1 * | 6/2014 | Magri | H04B 10/541 398/183 |
| 2017/0005747 A1 * | 1/2017 | Kim | H04J 14/0221 |
| 2017/0134114 A1 * | 5/2017 | Boertjes | H04J 14/0257 |

OTHER PUBLICATIONS

Jinno et al., "Concept and Enabling Technologies of Spectrum-Sliced Elastic Optical Path Network (SLICE)", OSA/ACP 2009, pp. 1-2.

Takara et al., "Spectrally-efficient elastic optical path networks", 15th OptoElectronics and Communications Conference (OECC2010) Technical Digest, Jul. 2010, pp. 1-2.

\* cited by examiner

30 →

| Nominal central frequencies (THz) for spacings of | | | | Approx. nominal central wavelengths (nm) |
|---|---|---|---|---|
| 12.5 GHz | 25 GHz | 50 GHz | 100 GHz | |
| 195.8875 | – | – | – | 1530.43 |
| 195.8750 | 195.875 | – | – | 1530.53 |
| 195.8625 | – | – | – | 1530.63 |
| 195.8500 | 195.850 | 195.85 | – | 1530.72 |
| 195.8375 | – | – | – | 1530.82 |
| 195.8250 | 195.825 | – | – | 1530.92 |
| 195.8125 | – | – | – | 1531.02 |
| 195.8000 | 195.800 | 195.80 | 195.8 | 1531.12 |
| 195.7875 | – | – | – | 1531.21 |
| 195.7750 | 195.775 | – | – | 1531.31 |
| 195.7625 | – | – | – | 1531.41 |
| 195.7500 | 195.750 | 195.75 | – | 1531.51 |
| 195.7375 | – | – | – | 1531.60 |
| 195.7250 | 195.725 | – | – | 1531.70 |
| 195.7125 | – | – | – | 1531.80 |
| 195.7000 | 195.700 | 195.70 | 195.7 | 1531.90 |
| 195.6875 | – | – | – | 1532.00 |
| 195.6750 | 195.675 | – | – | 1532.09 |
| 195.6625 | – | – | – | 1532.19 |
| . | . | . | . | . |
| . | . | . | . | . |
| . | . | . | . | . |
| . | . | . | . | . |
| . | . | . | . | . |
| . | . | . | . | . |
| 193.2375 | – | – | – | 1551.42 |
| 193.2250 | 193.225 | – | – | 1551.52 |
| 193.2125 | – | – | – | 1551.62 |
| 193.2000 | 193.200 | 193.20 | 193.2 | 1551.72 |
| 193.1875 | – | – | – | 1551.82 |
| 193.1750 | 193.175 | – | – | 1551.92 |

*FIG. 2*

FLEXIBLE GRID OPTICAL SPECTRUM TRANSMITTER, RECEIVER, AND TRANSCEIVER

CROSS-REFERENCE TO RELATED APPLICATION(S)

The present non-provisional patent application is a continuation of U.S. patent application Ser. No. 14/918,108, filed Oct. 20, 2015, and entitled "FLEXIBLE OPTICAL SPECTRUM MANAGEMENT SYSTEMS AND METHODS," which is a continuation of U.S. patent application Ser. No. 13/218,759, filed Aug. 26, 2011 (now U.S. Pat. No. 9,197,354 which issued on Nov. 24, 2015), and entitled "CONCATENATED OPTICAL SPECTRUM TRANSMISSION SYSTEM," which claims priority to U.S. Provisional Patent Application Ser. No. 61/377,290, filed Aug. 26, 2010, and entitled "CONCATENATED OPTICAL SPECTRUM TRANSMISSION SYSTEM," each is incorporated in full by reference herein.

FIELD OF THE INVENTION

The present invention relates generally to optical transmission systems and methods. More particularly, the present invention relates to flexible optical spectrum transmission systems and methods that include a flexible grid optical spectrum transmitter, receiver, and transceiver which uses optical spectrum through a plurality of bins to reduce or eliminate deadbands or guardbands (i.e., unused optical spectrum) between channels.

BACKGROUND OF THE INVENTION

Fiber optic transmission systems and methods are widely recognized as the most efficient way to transmit large amounts of data over long distances. An important metric for these systems and methods is called spectral efficiency. Spectral efficiency is a measure of the rate at which data can be transmitted in a given amount of optical spectrum, usually expressed in bits/s/Hz. The size of the available optical spectrum is determined by factors such as the wavelength of low attenuation in transmission fiber, bandwidth of optical amplifiers, and availability of suitable semiconductor lasers and detectors. For example, the C-band may generally include optical spectrum of 1530-1565 nm which corresponds to the amplification range and bandwidth of erbium-doped fiber amplifiers (EDFAs). Given that there is a finite useable spectral range, the spectral occupancy and a given bit-rate of channel, the spectral efficiency of a dense wave division multiplexing (DWDM) system then determines the maximum information carrying capacity. As data demands increase, there is consistently a need for more information carrying capacity given the finite constraints on the useable spectral range.

BRIEF SUMMARY OF THE INVENTION

In an exemplary embodiment, a flexible grid optical transmitter communicatively coupled to an optical network includes a coherent optical transmitter configured to generate a signal at a respective frequency/wavelength center and spanning a plurality of bins of optical spectrum, wherein a size of each of the plurality of bins is based on a required roll off of a wavelength selective component in the optical network. A number of the plurality of bins is based on a baud rate of the signal. The respective frequency/wavelength center and the plurality of bins of optical spectrum can be provided to the coherent optical transmitter by a management system which manages the optical spectrum as flexible spectrum. The coherent optical transmitter can be tunable to generate the signal at the respective frequency/wavelength center. The coherent optical transmitter can have a dynamic range wide enough to generate the signal at any respective frequency/wavelength center in the optical spectrum. The signal can utilize any of duo-binary, quadrature amplitude modulation (QAM), differential phase shift keying (DPSK), differential quadrature phase shift keying (DQPSK), orthogonal frequency-division multiplexing (OFDM), and polarization multiplexing with any of the foregoing.

In another exemplary embodiment, a flexible grid optical receiver communicatively coupled to an optical network a coherent optical receiver configured to receive a signal at a respective frequency/wavelength center and spanning a plurality of bins of optical spectrum, wherein a size of each of the plurality of bins is based on a required roll off of a wavelength selective component in the optical network. A number of the plurality of bins is based on a baud rate of the signal. The respective frequency/wavelength center and the plurality of bins of optical spectrum can be provided to the coherent optical receiver by a management system which manages the optical spectrum as flexible spectrum. The coherent optical receiver can be tunable to receive the signal at the respective frequency/wavelength center. The coherent optical receiver can select the signal from the optical spectrum while rejecting other signals present. The signal can utilize any of duo-binary, quadrature amplitude modulation (QAM), differential phase shift keying (DPSK), differential quadrature phase shift keying (DQPSK), orthogonal frequency-division multiplexing (OFDM), and polarization multiplexing with any of the foregoing.

In a further exemplary embodiment, a flexible grid optical transceiver communicatively coupled to an optical network includes a coherent optical transmitter configured to generate a transmit signal at a first frequency/wavelength center and spanning a first plurality of bins of optical spectrum; and a coherent optical receiver configured to receive a receive signal at a second frequency/wavelength center and spanning a second plurality of bins of optical spectrum, wherein a size of each of the first plurality of bins and the second plurality of bins is based on a required roll off of a wavelength selective component in the optical network. A number of the first plurality of bins and the second plurality of bins is based on a baud rate of the transmit signal and the receive signal, respectively. The first frequency/wavelength center, the second frequency/wavelength center, the first plurality of bins, and the second plurality of bins can be provided to the coherent optical transceiver by a management system which manages the optical spectrum as flexible spectrum. The coherent optical transmitter can be tunable to generate the transmit signal at the first frequency/wavelength center. The coherent optical transmitter can have a dynamic range wide enough to generate the signal at any frequency/wavelength center in the optical spectrum. The coherent optical receiver can be tunable to receive the receive signal at the respective frequency/wavelength center. The coherent optical receiver can select the receive signal from the optical spectrum while rejecting other signals present. The signal can utilize any of duo-binary, quadrature amplitude modulation (QAM), differential phase shift keying (DPSK), differential quadrature phase shift keying (DQPSK), orthogonal frequency-division multiplexing (OFDM), and polarization multiplexing with any of the foregoing.

In an exemplary embodiment, a flexible optical spectrum management method in an optical network including a plurality of interconnected network elements includes determining an associated frequency/wavelength center and one or more bins for each of one or more traffic carrying channels on optical fibers in the optical network; and managing the one or more traffic carrying channels on the optical fibers using the one or more bins of bins and the associated frequency/wavelength center, wherein at least one of the one or more traffic carrying channels includes a coherent optical signal occupying a flexible spectrum on the optical fibers. A size of each of the one or more of bins can be smaller than or equal to a smallest required roll off of a wavelength selective component in the optical network. A plurality of the one or more traffic carrying channels can each be managed by concatenating a number of the one or more of bins together. Different baud rate channels are allocated a different number of bins. The method can be performed by one of a network management system (NMS), an element management system (EMS), a network controller, and a module in a network element. Each of a plurality of traffic carrying channels with a same A-Z path in the optical network can be in a concatenated number of bins together without a deadband between any of the plurality of traffic carrying channels. A guardband can be configured using one or more bins for traffic carrying channels with a different A-Z path in the optical network.

In another exemplary embodiment, a management system configured for flexible optical spectrum management in an optical network including a plurality of interconnected network elements includes a processor configured to determine an associated frequency/wavelength center and one or more bins for each of one or more traffic carrying channels on optical fibers in the optical network, and manage the one or more traffic carrying channels on the optical fibers using the one or more bins of bins and the associated frequency/wavelength center, wherein at least one of the one or more traffic carrying channels includes a coherent optical signal occupying a flexible spectrum on the optical fibers. A size of each of the one or more bins can be smaller than or equal to a smallest required roll off of a wavelength selective component in the optical network. A plurality of the one or more traffic carrying channels can each be managed by concatenating a number of the one or more of bins together. Different baud rate channels are allocated a different number of bins. The management system can be one of a network management system (NMS), an element management system (EMS), a network controller, and a module in a network element. Each of a plurality of traffic carrying channels with a same A-Z path in the optical network can be in a concatenated number of bins together without a deadband between any of the plurality of traffic carrying channels. A guardband can be configured using one or more bins for traffic carrying channels with a different A-Z path in the optical network.

In a further exemplary embodiment, an optical network configured for flexible optical spectrum management includes a plurality of network elements interconnected by optical fibers; and a management system configured to determine an associated frequency/wavelength center and one or more bins for each of one or more traffic carrying channels on the optical fibers in the optical network, and manage the one or more traffic carrying channels on the optical fibers using the one or more bins of bins and the associated frequency/wavelength center, wherein at least one of the one or more traffic carrying channels includes a coherent optical signal occupying a flexible spectrum on the optical fibers. A size of each of the one or more bins can be smaller than or equal to a smallest required roll off of a wavelength selective component in the optical network. A plurality of the one or more traffic carrying channels can each be managed by concatenating a number of the one or more bins together. Different baud rate channels are allocated a different number of bins. The management system can be one of a network management system (NMS), an element management system (EMS), a network controller, and a module in a network element. Each of a plurality of traffic carrying channels with a same A-Z path in the optical network are in a concatenated number of bins together without a deadband between any of the plurality of traffic carrying channels, and wherein a guardband can be configured using one or more bins for traffic carrying channels with a different A-Z path in the optical network.

In an exemplary embodiment, an optical network includes a first network element; a second network element communicatively coupled to the first network element by a first optical fiber; a first plurality of optical channels over the first optical fiber; and a second plurality of optical channels over the first optical fiber; wherein each of the first plurality of optical channels are located on an optical spectrum with substantially no spectrum between adjacent channels, and wherein each of the second plurality of optical channels are located on the optical spectrum with substantially no spectrum between adjacent channels. A guardband may be defined on the optical spectrum between one end of the first plurality of optical channels and one end of the second plurality of optical channels. The optical network may include a first flexible spectrum wavelength selective switch at the second network element, the first flexible spectrum wavelength selective switch configured to drop the first plurality of optical channels. The guardband may be spectrally defined based on a roll-off associated with the first flexible spectrum wavelength selective switch. The optical network may further include, at the second network element, a first power splitter coupled to a drop port of the first wavelength selective switch; and a first plurality of Common Mode Rejection Ratio (CMRR) coherent optical receivers coupled to the power splitter, wherein each of the first plurality of CMRR coherent optical receivers receives each of the first plurality of optical channels and selectively receives one of the first plurality of optical channels. The first flexible spectrum wavelength selective switch may include a continuous spectral response on adjacent actuated portions of the optical spectrum when pointed to the same port.

The optical network may include a third network element communicatively coupled to the second network element by a second optical fiber; wherein the second plurality of optical channels is communicated over the second optical fiber and the first optical fiber. The optical network may include a second flexible spectrum wavelength selective switch at the third network element, the second flexible spectrum wavelength selective switch configured to drop the second plurality of optical channels. The optical network may further include, at the third network element, a second power splitter coupled to a drop port of the second flexible spectrum wavelength selective switch; and a second plurality of Common Mode Rejection Ratio (CMRR) coherent optical receivers coupled to the power splitter, wherein each of the second plurality of CMRR coherent optical receivers receives each of the second plurality of optical channels and selectively receives one of the second plurality of optical channels. The optical network may include a plurality of bins defined on the optical spectrum, wherein each of the first plurality of optical channels and each of the second plurality of optical channels are assigned to one or more of the plurality of bins. At least two of the first plurality of optical channels may include a different baud rate.

In another exemplary embodiment, an optical system includes a flexible spectrum wavelength selective switch receiving a wavelength division multiplexed (WDM) signal and including at least one drop port configured to receive a first group of optical channels from the WDM signal with adjacent channels spectrally spaced substantially next to one another; a power splitter coupled to the at least one drop port; and a plurality of Common Mode Rejection Ratio (CMRR) coherent optical receivers coupled to the power splitter, wherein each of the CMRR coherent optical receivers receives each of the first group of optical channels and selectively receives one of the first group of optical channels. The flexible spectrum wavelength selective switch may include a continuous spectral response on adjacent actuated portions of an optical spectrum when pointed to the at least one drop port. The flexible spectrum wavelength selective switch may further include at least one express port configured to receive a second group of optical channels from the WDM signal, wherein an optical spectrum of the WDM signal may include a guardband between the first group of optical channels and the second group of optical channels. The guardband may be spectrally defined based on a roll-off associated with the flexible spectrum wavelength selective switch.

In yet another exemplary embodiment, a method includes defining a plurality of bins on an optical spectrum associated with an optical fiber; dropping a first optical signal to a first coherent optical receiver, wherein the first optical signal uses one or more bins of the plurality of bins; and dropping a second optical signal to a second coherent optical receiver, wherein the second optical signal uses one or more of adjacent bins to the one or more bins used by the first optical signal. The method may further include defining guardbands in one or more of the plurality of bins, wherein the guardbands are spectrally defined based on a roll-off associated with a flexible spectrum wavelength selective switch. A number of bins for each of the first optical signal and the second optical signal may be based on a format and baud rate associated therewith. The method may further include utilizing a management system to provision the first optical signal in the one or more bins.

BRIEF DESCRIPTION OF THE DRAWINGS

The present invention is illustrated and described herein with reference to the various drawings of exemplary embodiments, in which like reference numbers denote like method steps and/or system components, respectively, and in which:

FIG. 2 is a table of an exemplary standard set of channels and frequencies for optical spectrum from the International Telecommunication Union (ITU);

DETAILED DESCRIPTION OF THE INVENTION

In various exemplary embodiments, the present disclosure relates to concatenated optical spectrum transmission systems and methods that allocate optical spectrum of groups of channels to reduce or eliminate deadbands or guardbands (i.e., unused optical spectrum) between channels. The concatenated optical spectrum transmission systems and methods include various techniques for using optical spectrum such as over the C-band or any other frequency bands. In particular, the concatenated optical spectrum transmission systems and methods provide a balance between fixed channel systems such as provided for by the International Telecommunication Union (ITU) and a more flexible system enabled by coherent optical detection. In an exemplary embodiment, the concatenated optical spectrum transmission systems and methods may utilize a Wavelength Selective Switch (WSS) and a plurality of moderate Common Mode Rejection Ratio (CMRR) coherent receivers in combination to achieve a concatenated optical spectrum.

Figure 1:
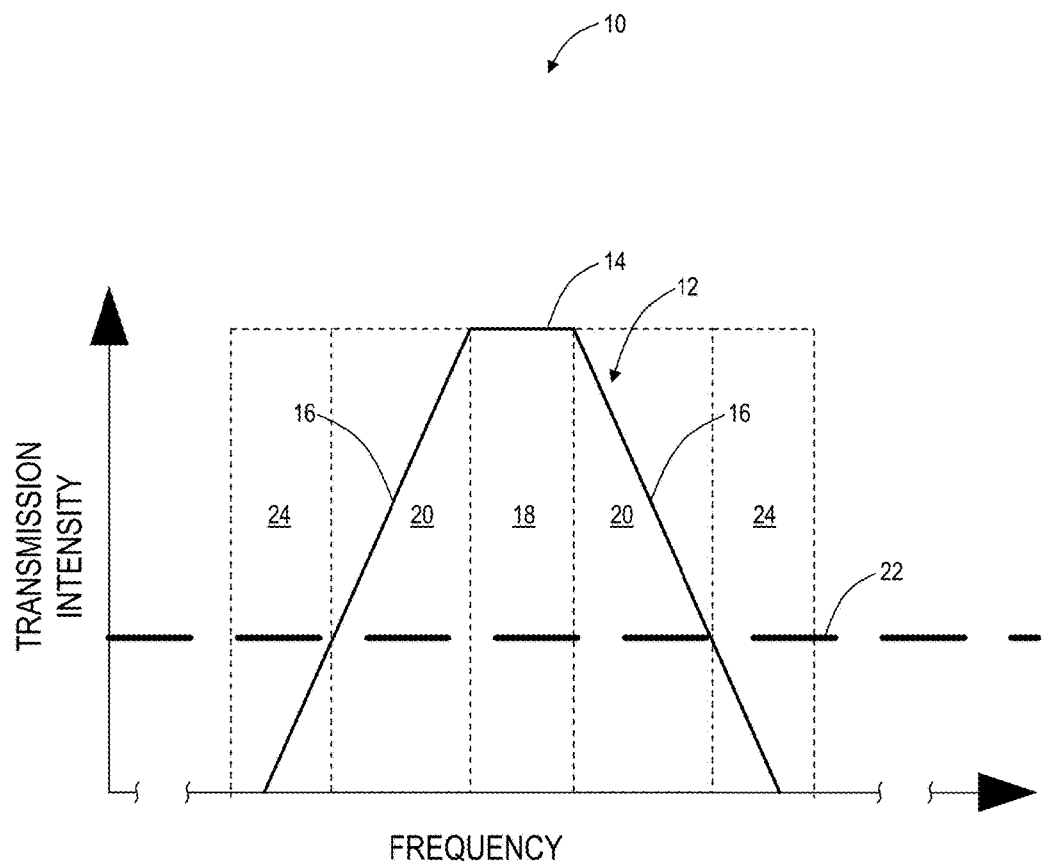
FIG. 1 is a spectral diagram of wavelength channel spacing constrained by a demultiplexer filter response.

Referring to FIG. 1, in an exemplary embodiment, a spectral diagram 10 illustrates wavelength channel spacing constrained by a demultiplexer filter frequency response 12. The spectral diagram 10 is a diagram of optical frequency versus transmission intensity, and the exemplary spectral diagram 10 illustrates an optical channel. Prior to the advent of commercially available coherent optical transponders, all receivers required the DWDM system to filter out all but one optical channel before it was presented to a photodetector. Any practical filter has a passband shape response 12 which has a range of frequencies it can pass efficiently, and then a gradual decrease in transmission efficiency until the point where an acceptable isolation is achieved. For example, the shape response 12 shows an example shape which may be encountered in such a system. The shape response 12 includes a passband portion 14 and roll off portions 16. The limiting factor for channel spacing in these systems is the roll-off portions 16 of practical filters. In particular, the optical spectrum in the spectral diagram 10 may include various frequency portions including a useable channel passband 18 defined by the passband portion 14, unusable spectrum 20 where the roll off portions 16 extends to a minimum receiver isolation level 22, and a closest useable adjacent channel portion 24. The passband portion 14 may generally be referred to as having guardbands, i.e. the passband portion 14 is spaced apart by the unusable spectrum 20 or guardbands. The best way to overcome this waste of spectrum previously was to create filters with a sharper roll off portion 16 thereby minimizing the unusable spectrum 20. Disadvantageously, such systems and methods introduce extra complications and expense.

Referring to FIG. 2, in an exemplary embodiment, a table 30 illustrates an exemplary standard set of channels for optical spectrum. In particular, the table 30 is defined by the ITU and provides a standard set of channels offset by equal frequency spacing, e.g. 12.5 GHz, 25 GHz, 50 GHz, and 100 GHz in the table 30. For example, the standardization of optical spectrum are described in ITU-T Recommendation G.694.1 (June 2002) Spectral grids for WDM applications: DWDM frequency grid and ITU-T Recommendation G.698.2 (November 2009) Amplified multichannel DWDM applications with single channel optical interfaces, the contents of each are incorporated by reference herein. The channels in the table 30 are defined to provide an acceptable channel passbands and guardbands. One advantage of standardizing channels is to allow a common set of laser sources to be provided in the market. Another advantage is to allow management systems to have a common way of enumerating channels so as to keep track of them regardless of the manufacturer. In an exemplary embodiment, the concatenated optical spectrum transmission systems and methods may utilize the channels in the table 30 but in a modified fashion to adjust for application requirements such as with coherent optical detection.

Figure 3:
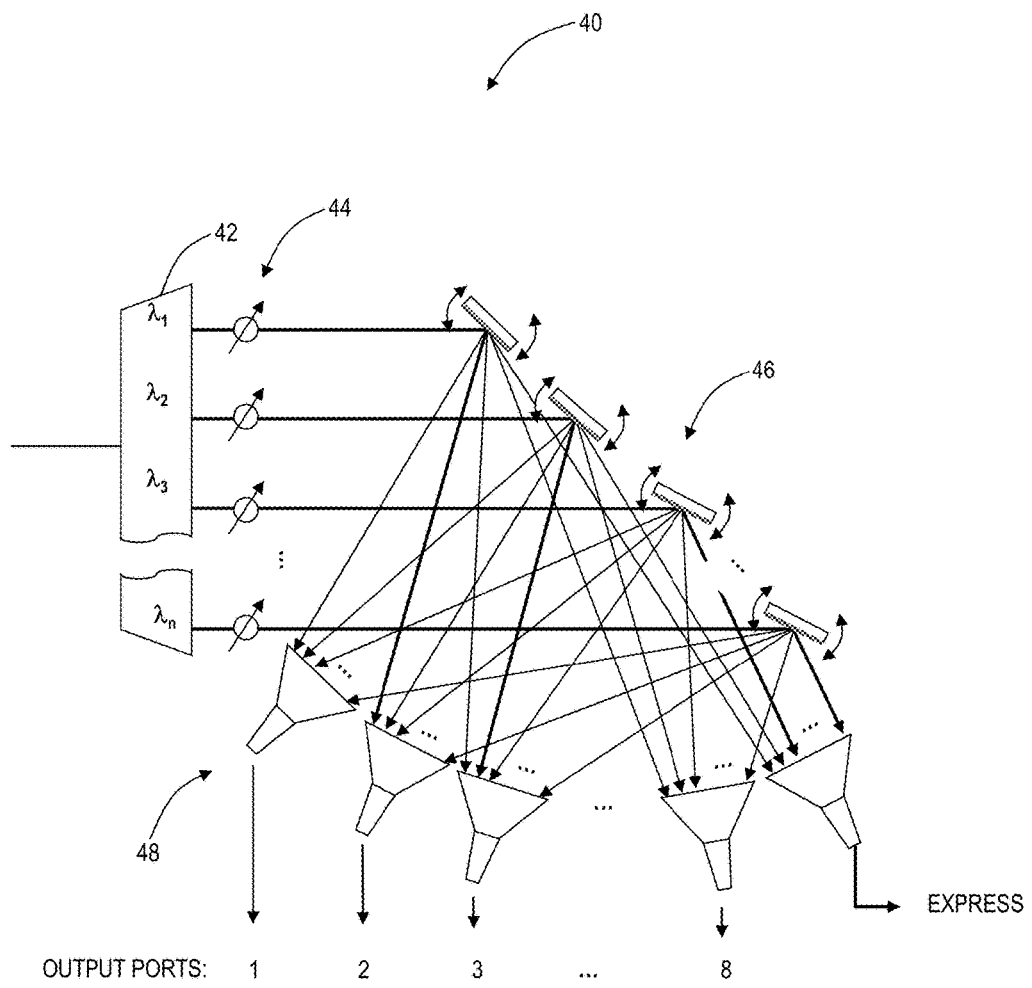
FIG. 3 is diagram of an exemplary micro-electromechanical system (MEMS)-based wavelength-selective switch (WSS)

Referring to FIG. 3, in an exemplary embodiment, an exemplary micro-electromechanical system (MEMS)-based wavelength-selective switch (WSS) 40 is illustrated. In this exemplary WSS 40, an input fiber including multiple wavelengths $\lambda_1, \lambda_2, \ldots \lambda_n$ of optical signals is input into a de-multiplexer 42, such as a diffraction grating or the like. The de-multiplexer 42 separates each wavelength from the common input, and optionally a variable optical attenuator (VOA) 44 can be included following the de-multiplexer 42. VOAs 44 are configured to provide variable attenuation to the wavelength, and the VOAs 44 can be remotely and dynamically set to a range of values. The WSS 40 includes a pixel array 46 for each of the wavelengths $\lambda_1, \lambda_2, \ldots \lambda_n$. The pixel array 46 includes a plurality of pixels per channel that deflect the optical signal to an appropriate output port 48. Advantageously, the WSS 40 is fully reconfigurable for adding, dropping, and expressing through optical signals. Since there is the pixel array 46 for each of the optical signals, any signal can be dropped to any of the output ports 48. Additionally, multiple wavelengths including all wavelengths can be dropped to a single port 48, such as an express port. To indicate device fan out, these WSS devices are often classified as "1×N" devices, e.g., a "1×9" WSS means a ten port device, with one common input and nine output ports.

The WSS 40 may be a flexible spectrum WSS which can switch and attenuate on arbitrary widths of spectrum based on the pixel array 46. In particular, the flexible spectrum WSS 40 is utilized in the concatenated optical spectrum transmission systems and methods to provide arbitrary spectral widths to avoid or reduce guardbands on optical spectrum. In an exemplary embodiment, the pixel array 46 may include a Liquid crystal on silicon (LCOS) device with thousands of columns, pixels, etc. with hundreds of pixels per optical channel. In another exemplary embodiment, the pixel array 46 may include a Digital Light Processing (DLP) (available from Texas Instruments Inc.) device. Specifically, the pixel array 46 may include any pixelated device which enables flexible spectrum for each optical channel. For example, the flexible spectrum WSS 40 may include a granularity of 1 GHz or less per channel.

Figure 4A:
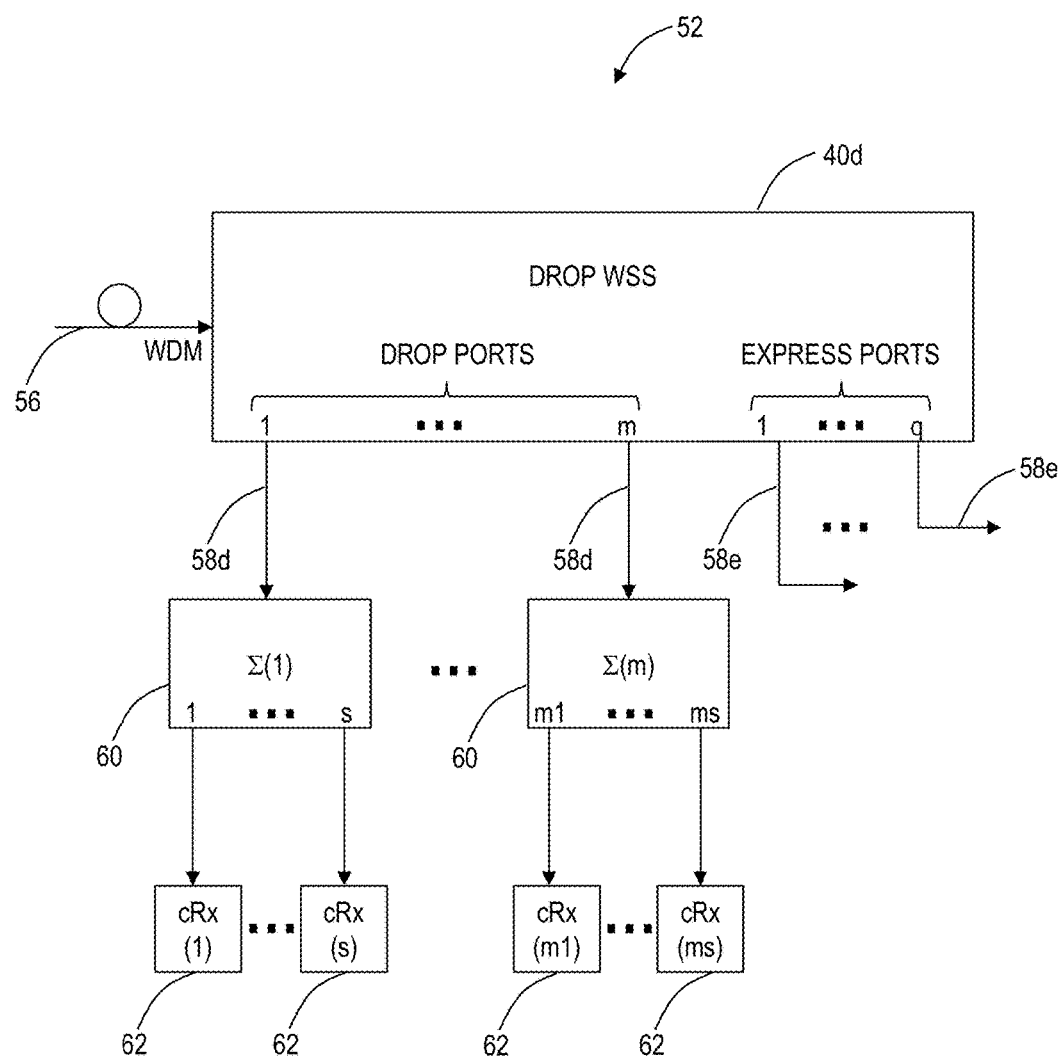
FIG. 4A is a drop section of an exemplary coherent augmented optical add/drop multiplexer (OADM)
Figure 4B:
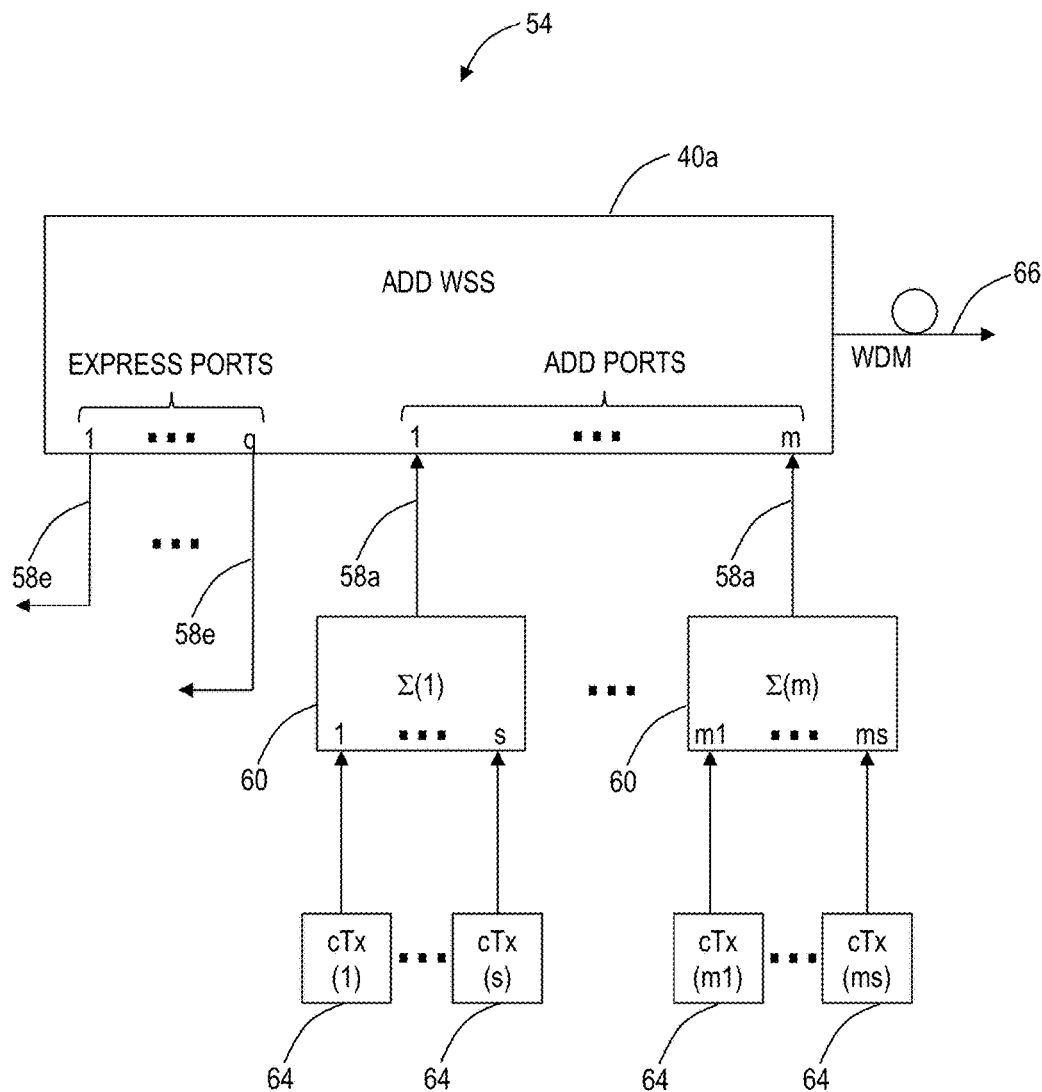
FIG. 4B is an add section of the exemplary coherent augmented OADM.

Referring to FIGS. 4A and 4B, in an exemplary embodiment, an exemplary coherent augmented optical add/drop multiplexer (OADM) is illustrated with a drop section 52 and an add section 54. In FIG. 4A, the drop section 52 includes an n-channel Wavelength Division Multiplexed (WDM) signal 56 input to a drop section WSS 40*d* having a set of p ports 58 (p being a positive integer), which are allocated between q (where q is an integer greater than or equal to zero) express ports 58*e* and *m* (where m is an integer an equal to p minus q) drop ports 58*d*. The drop section WSS 40*d* may include the WSS 40 in FIG. 3 or any other implementation that is generally configured to route any given channel from the input WDM signal 56 to any of the p ports 58 in a dynamic and reconfigurable manner. Using the drop section WSS 40*d*, a respective set of w (where w is an integer) wavelength channels from the WDM signal 56 may be supplied to each drop port 58*d*. The number of wavelength channels supplied to any given drop port 58*d* may be the same, or different from the number of wavelength channels supplied to another one of the drop ports 58*d*.

A 1:s power splitter 60 (where s is an integer) may be connected to each drop port 58*d* then supplies the respective set of channels to each one of a corresponding set of s coherent optical receivers (cRx) 62. The power splitter 60 is configured to receive an output from each of the drop ports 58*d* and perform a splitting function providing a split copy of the output to s outputs. As described herein, the drop section WSS 40*d* may be a conventional WSS. In an exemplary embodiment, the WDM signal 56 may be formatted to conform with a standard spectral grid, for example an ITU-T grid having a 100 GHz channel spacing illustrated in the table 30. In exemplary embodiments, the WDM signal 56 may have between n=32 and n=96 wavelength channels, and the WSS 40*d* may have p=20 ports 48. The number (m) of drop ports 58*d*, and the number (q) of express ports 58*e* may be selected as appropriate. For example, in a mesh network node requiring eight-degree branching, a set of q=7 express ports 58*e* is required, leaving m=13 ports available for use as drop ports 58*d*.

Each coherent receiver (cRx) 62 may be tunable, so that it can receive a wavelength channel signal centered at a desired carrier wavelength (or frequency). In an exemplary embodiment in which tunable coherent receivers are used, the frequency range of each coherent receiver (cRx) 62 may be wide enough to enable the coherent receiver (cRx) 62 to tune in any channel of the WDM signal 56. In other exemplary embodiments, the dynamic range of each coherent receiver (cRx) 62 may be wide enough to enable the coherent receiver (cRx) 62 to tune in anyone of a subset of channels of the WDM signal 56, such as w channels associated with the particular drop port 58*d*. With the arrangement of FIG. 4A, each of the coherent receivers (cRx) 62 must be designed having a Common Mode Rejection Ratio (CMRR) which enables the coherent receiver (cRx) 62 to tune in and receive a selected one channel while rejecting each of the other s−1 channels presented to it by the power splitter 60. Because s<n, the CMRR requirement for the coherent receivers (cRx) 62 is significantly lower than that which would be required to support all n channels. This relaxed CMRR requirement means that lower cost coherent receivers may be used. However, it will be seen that, even with the lower CMRR of each coherent receiver 62, a total drop count of d=m*s is achieved. For example, consider a network system in which the WDM signal 56 has n=96 wavelength channels, and the WSS 40*d* has m=6 drop ports, each of which receives a respective set of s=16 channels. In this case, the total drop count is d=6*16=96 channels. In an exemplary embodiment, the coherent receiver 62 may be configured to support all of the n wavelengths. Here, the channels presented to the coherent receiver 62 from the power splitter 60 do not have to be adjacent, but could be scattered anywhere across the n wavelengths. In another exemplary embodiment, the coherent receiver 62 is configured to accept a subset of the n wavelengths, e.g. s wavelengths per receiver 62. In FIG. 4B, the add section 54 of the coherent augmented OADM operates in a manner that is effectively the reciprocal of the drop section 52 of FIG. 4B. Thus, an add section WSS 40a is provided with a set of ports 58, which are designated as either add-ports 58a or express ports 58e. The add section WSS 40a operates to add the channels received through each port 58a into an outbound WDM signal 66 which is launched into a downstream optical fiber medium. Each express port 40e receives a respective WDM optical signal from upstream optical equipment such as, for example, the drop section 52 of the same (or a different) OADM. Each add port 58a is connected to an s:1 power combiner 66 (where s is an integer) which combines the channel signals generated by a respective set of coherent optical transmitters (cTx) 64. Some or all of the coherent optical transmitters (cTx) 64 connected to a given power combiner 66 may be operating at any given time, so each add port 58a will receive a respective set of w (where is an integer less than or equal to s) wavelength channels. The number of wavelength channels received by any given add port 58a may be the same, or different from the number of wavelength channels received by another one of the add ports 58a. With this arrangement, the total number of transmitters that can be supported is t=m*s. For example, consider a network system having a capacity of n=96 wavelength channels, and the add section WSS 40a has m=6 add ports, each of which is coupled to a power combiner 66 that supports a respective set of s=16 transmitters. In a case where all of the transmitters are generating a respective wavelength channel, each add port 58a will receive a set of s=16 channels, and the total add count is t=6*16=96 channels.

In an exemplary embodiment, each coherent optical transmitter (cTx) 64 is tunable so that it can selectively generate a wavelength channel signal centered at a desired carrier wavelength (or frequency). In exemplary embodiments in which tunable coherent optical transmitters (cTx) 64 are used, the dynamic range of each transmitter (cTx) 64 may be wide enough to enable the transmitter (cTx) 64 to generate any channel of the WDM signal 56. In other exemplary embodiments, the dynamic range of each transmitter (cTx) 64 may be wide enough to enable the transmitter (cTx) 64 to generate anyone of a subset of channels of the WDM signal 56, such as one of s signals. The coherent optical receivers (cRx) 62 and the coherent optical transmitters (cTx) 64 may be configured to use any of duo-binary, quadrature amplitude modulation (QAM), differential phase shift keying (DPSK), differential quadrature phase shift keying (DQPSK), orthogonal frequency-division multiplexing (OFDM), polarization multiplexing with any of the foregoing, and any other type of coherent optical modulation and detection technique. It is understood that for electronic channel discrimination, a tunable Rx is required. In nQAM and nPSK it is achieved using a linear receiver, i.e. a receiver where frequency mixing is taking place between a local oscillator and the incoming signal. The local oscillator needs to be tuned at the right frequency such that the mixing product can be at base band where all the necessary filtering will occur. If a receiver is not operating like above, it requires a tunable optical filter prior to the optical detector.

Generally, the WSS 40, 40a, 40d and other types of WSSs are essentially a polychrometer device with multiple output/input ports. Individual channels (i.e., wavelengths) can be switched by such a device and sharp roll-offs can be achieved. That is, the WSS 40, 40a, 40d may be utilized to provide s demultiplexer function such as illustrated by the demultiplexer filter shape response 12 in FIG. 1. The flexible spectrum WSS 40, 40a, 40d can provide significantly improved roll-off portions 16 from other technologies such as arrayed waveguide gratings (AWGs) or thin film filters (TFFs). In an exemplary embodiment, the concatenated optical spectrum transmission systems and methods may utilize the coherent augmented OADM in FIG. 4 to eliminate individual channel filtering at the drop ports 58d. Thus, without the demultiplexer, individual channels may be arranged or spaced closer together only limited by the significantly improved roll-off portions 16 associated with the WSS 40, 40a, 40d. Advantageously, through such a configuration, deadbands or guardbands may be reduced or eliminated. The coherent augmented OADM of FIGS. 4A and 4B may include additional components which are omitted for simplicity. For example, one of ordinary skill in the art will recognize that there may be optical amplifiers added in these configurations to overcome the losses of WSS's 40a, 40d and splitters 60, e.g. in location 58d, and 58a.

Figure 5:
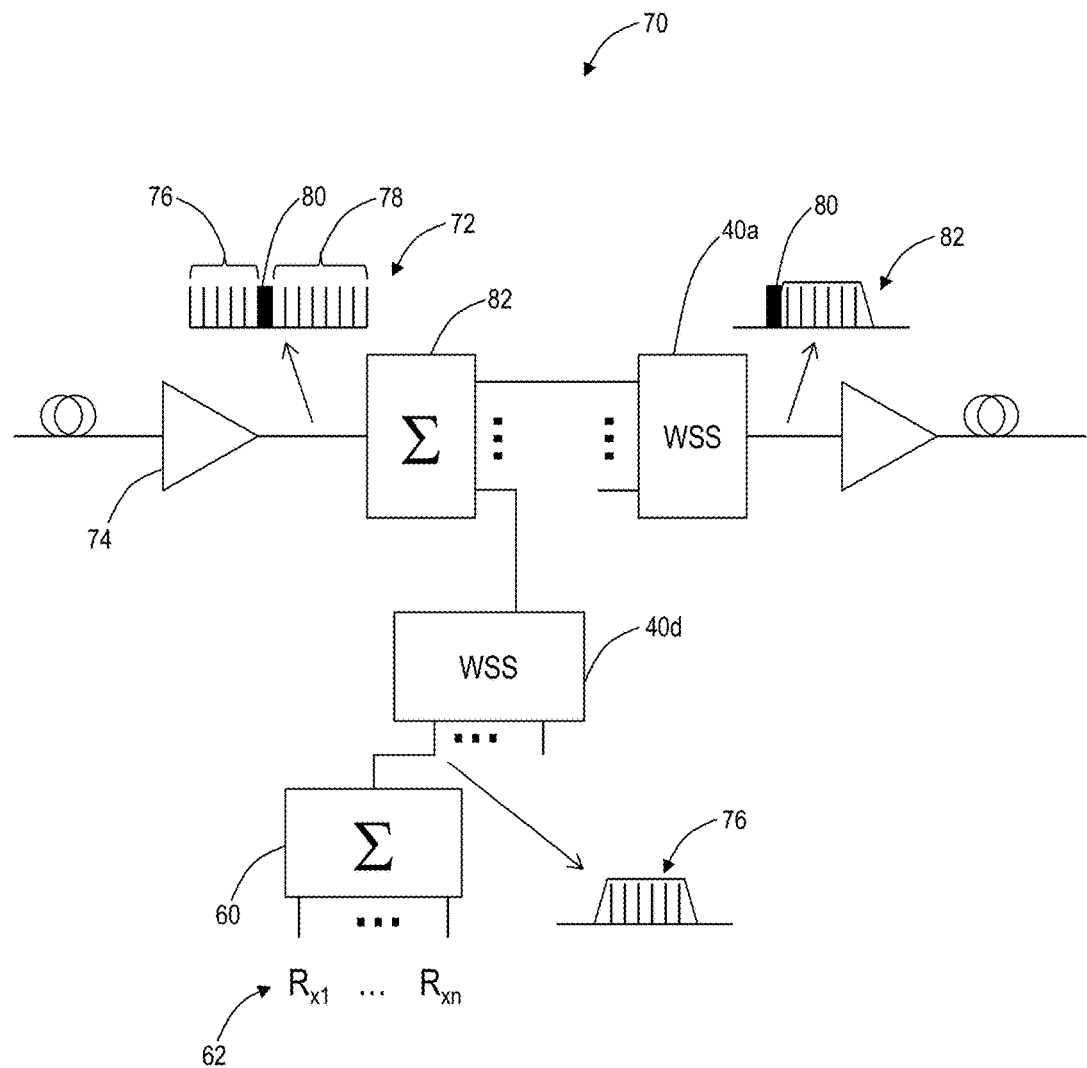
FIG. 5 is a nodal configuration using the coherent augmented OADM for guardband minimization in concatenated optical spectrum transmission systems and methods.

Referring to FIG. 5, in an exemplary embodiment, a nodal configuration 70 illustrates guardband minimization in the concatenated optical spectrum transmission systems and methods. The nodal configuration 70 includes the drop section WSS 40d and the add section WSS 40a associated with the coherent augmented OADM. To provide concatenated optical spectrum, the WSSs 40a, 40d provide a continuous spectral response on adjacent actuated portions of the spectrum when they are pointed to the same port 58. The selection of the number of these WSSs 40a, 40d and their respective spectral widths is arbitrary and can be chosen according to system need and device design convenience. An advantage of the concatenated optical spectrum transmission systems and methods is the ability to use the WSSs 40a, 40d which have roll-offs which require small guardbands, but some portion of spectrum is concatenated in such a way that there is no need for guardbands on adjacent channels within a sub-section of the spectrum.

The nodal configuration 70 receives a WDM signal 72 at an ingress point and optionally may include an optical amplifier 74 to amplify the received WDM signal 72. The received WDM signal 72 includes a plurality of channels (i.e. wavelengths) in a concatenated structure with respect to the optical spectrum. For example, the received WDM signal 72 may include drop channels 76 and express channels 78 with a guardband 80 therebetween. Specifically, each adjacent channel in the drop channels 76 and the express channels 78 may abut adjacent channels with little or no spectral space therebetween. The only unused spectrum in the received WDM signal 72 may include the guardband 80. In terms of network-wide functionality, the express channels 78 are configured to transit the nodal configuration 70 whereas the drop channels 76 are configured to be dropped and added at the nodal configuration 70. One of ordinary skill in the art will recognize the nodal configuration 70 may be repeated at other nodes in a network with the express channels 78 from the perspective of the nodal configuration 70 being drop channels 76 at another node. Furthermore, this functionality of the nodal configuration 70 applies as well to the coherent augmented OADM of FIGS. 4A and 4B.

The received and optionally amplified WDM signal 72 is input into a 1:z power splitter 82 where z is an integer. For example, z may be the number of ports in the nodal configuration 70 with one port per degree and one port for add/drop traffic. Alternatively, in a 1:2 node, the 1:z power splitter 82 may be omitted. The power splitter 82 is configured to split the WDM signal 72 in a plurality of copies on output connections coupled to a drop section WSS 40d and an add section WSS 40*a*. The drop section WSS 40*d* provides functionality similar to that described in FIG. 4A, namely there is no demultiplexer or filter in line to separate the individual channels of the drop channels 76. Rather, a power splitter 60 is configured to split the drop channels 76 into plural copies each of which is sent to coherent receivers (cRx) 62 which are configured with CMRR as described herein. In particular, the drop section WSS 40*d* is configured to perform a drop filtering function on the drop channels 76 prior to the power splitter 60. In such configuration with the CMRR coherent receivers (cRx) 62, the drop channels 76 may be in a concatenated optical spectrum where there is little or no guardbands between adjacent channels. Further, the CMRR coherent receivers (cRx) 62 are configured to receive all of the drop channels 76 and to selectively tune to a channel of interest.

The add section WSS 40*a* is configured to receive the express channels 78 from the power splitter 82 as well as local add traffic from coherent transmitters (cTx) 64 (not shown in FIG. 5). The add section WSS 40*a* includes an output WDM signal 82 which includes the guardband 80 between adjacent concatenated spectrum portions. With respect to adding channels in a concatenated fashion, the local add traffic may be added with the power combiners 66. In another exemplary embodiment, the add section WSS 40*a* may have add ports 58*a* for all local traffic, i.e. the WSS 40*a* may be configured to multiplex the locally added channels together with little or no space therebetween in terms of optical spectrum. For example, The WSS 40*a* may require a guardband for some isolation between the channels due to limitations on the flexible spectrum WSS 40*a*. Further, as WSS port count increases, it is also contemplated that the WSS 40*d* may drop channels on an individual basis with each channel having little or no spectral space therebetween based on the fact there is no need to provide isolation between ports on the WSS 40*d* in the concatenated optical spectrum transmission systems and methods described herein. Those of ordinary skill in the art will recognize other embodiments are also contemplated which generally will add channels in such a manner as to not have spectral space therebetween. Further, the coherent receivers 62 and the coherent transmitters 64 are illustrated as separate devices in FIG. 4, and those of ordinary skill in the art will recognize these may be a single device referred to as a CMRR coherent optical transceiver.

Figure 6:
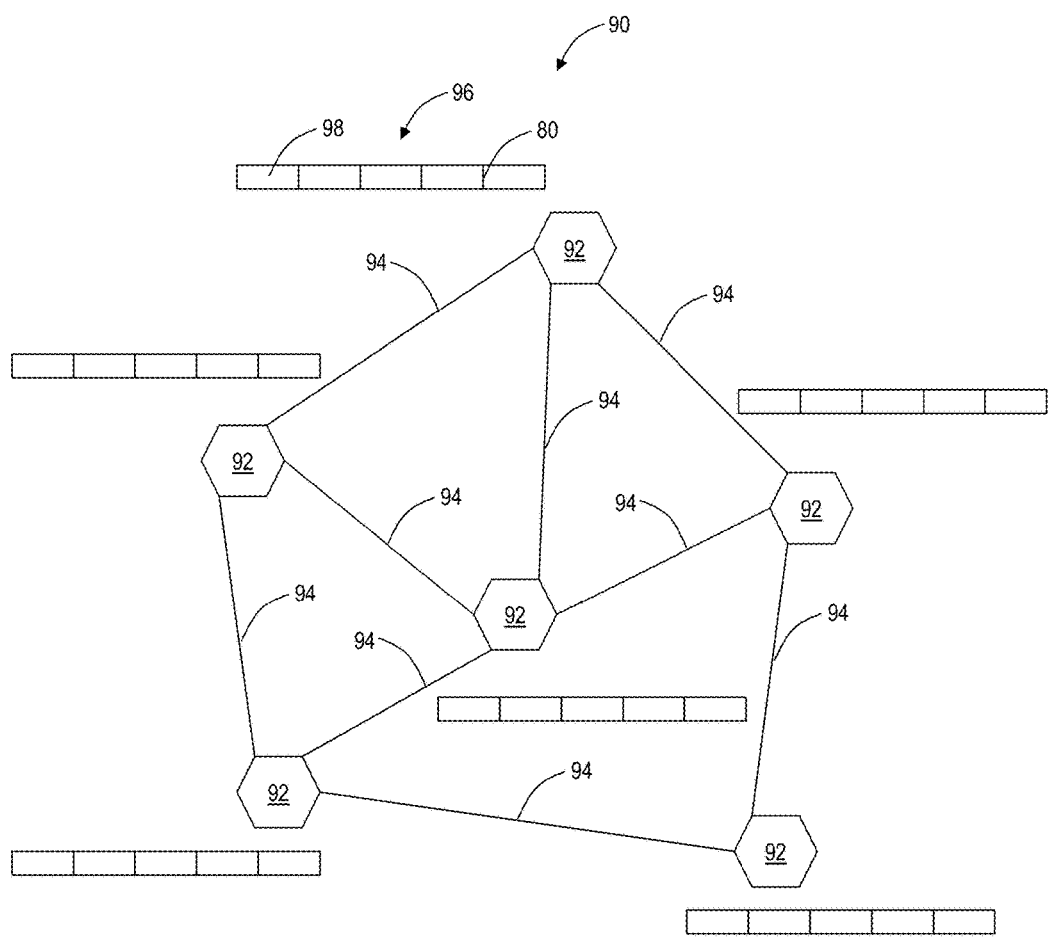
FIG. 6 is a network diagram of an exemplary network of plurality of optical network elements configured with the nodal configuration of FIG. 5.

Referring to FIG. 6, in an exemplary embodiment, a network 90 is illustrated of a plurality of optical network elements 92 configured with the nodal configuration 70 of FIG. 5. In this exemplary embodiment, the network elements 92 each may be configured to provide the concatenated optical spectrum transmission systems and methods. The network elements 92 may include any of WDM network elements, optical switches, cross-connects, multi-service provisioning platforms, routers, and the like with the CMRR coherent receivers (cRx) 62 and the coherent transmitters (cTx) 64. The network elements 92 are communicatively coupled therebetween by optical fiber 94. For example, the network elements 92 are connected in a mesh architecture in the exemplary network 90, and those of ordinary skill in the art will recognize the concatenated optical spectrum transmission systems and methods are contemplated for use with any network architecture, such as, for example, mesh, rings (BLSR, VLSR, UPSR, MS-SPRING, etc,), linear (1:1, 1+1, 1:N, 0:1, etc.), and the like.

The nodal architecture 70 at each of the network elements 92 is configured to transmit an optical spectrum 96 over the optical fibers 94. In the network 90, in an exemplary embodiment, traffic generated at any network element 92 may terminate on another network element 92. Even though there are a large number of channels in the DWDM band, there is a smaller number of unique A-Z paths. The A-Z path includes an originating network element 92 and a terminating network element 92 with potentially intermediate network elements 92 where the channels are expressed. At the originating network element 92 and the terminating network element 92, the channels in an A-Z path are added/dropped through the ports 58*a*, 58*d*. At the intermediate network elements 92, the channels in the A-Z path are expressed. Using the concatenated optical spectrum transmission systems and methods, the network 90 may be configured to group A-Z demands together and place channels in the spectrum going on the same path without deadbands between the channels in the same path. For example, the network 90 includes six network elements 92, and for full connectivity between each network element 90, the optical spectrum 96 may be segmented into five segments or groups 98. Within each group 98, there is little or no unused spectrum, i.e. deadbands, using the nodal configuration 70. Between the groups 98, there is the guardband 80.

Figure 7:
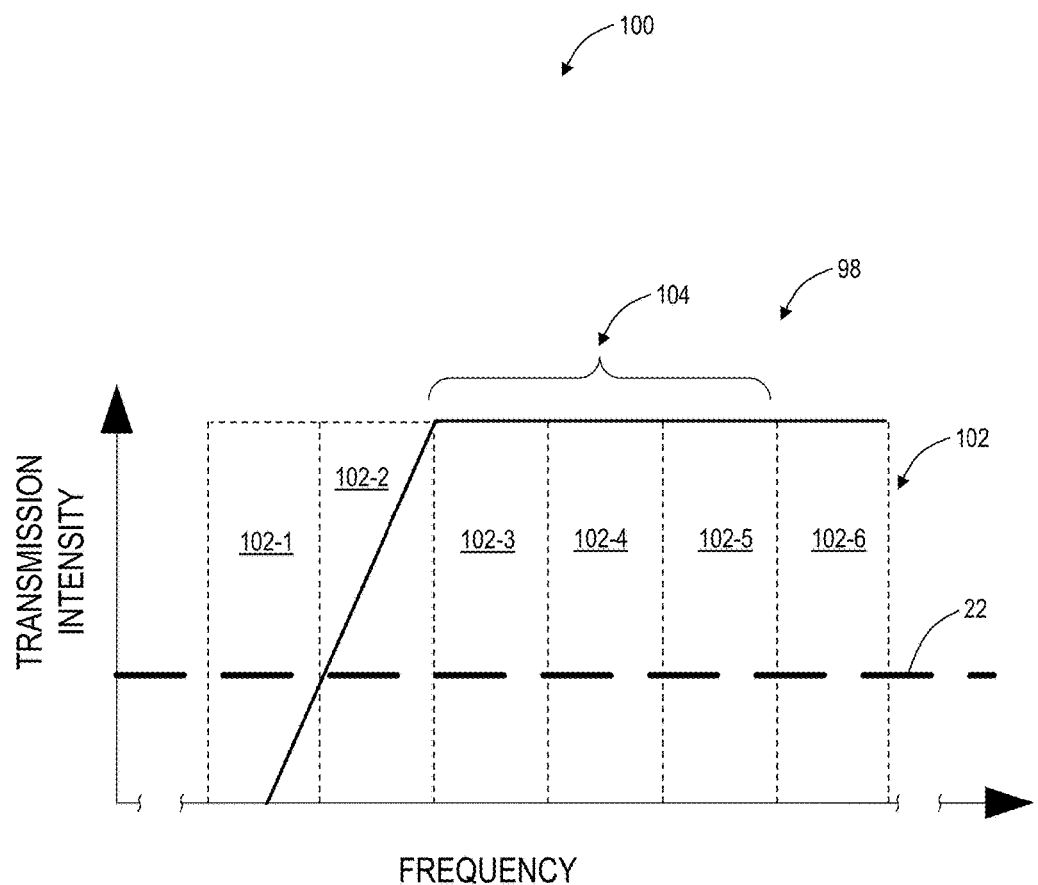
FIG. 7 is a spectral diagram of wavelength channel spacing utilizing a range, group, or bin of channels for the concatenated optical spectrum transmission systems and methods.

Referring to FIG. 7, in an exemplary embodiment, a spectral diagram 100 illustrates wavelength channel spacing utilizing a range, group, or bin of channels for the concatenated optical spectrum transmission systems and methods. In an exemplary embodiment, the concatenated optical spectrum transmission systems and methods may provide a completely variable spectrum where channels can be placed anywhere. In this embodiment, to avoid the deadbands, A-Z demands are placed in the same groups 90 in the spectrum. The spectral diagram 100 introduces additional constraints to the selection of spectral segments and the frequency range of channels for the concatenated optical spectrum transmission systems and methods. For example, in the concatenated optical spectrum transmission systems and methods, there are no requirements to define channels, frequencies, etc., but such a configuration is burdensome in operation for network operators. The aim of this approach is to constrain the channel placement in such a way as to ease the concerns of operators of such networks, i.e. to produce a set of channels which is manageable similarly to the ITU grids which have become ubiquitous. However, this approach includes flexibility to account for the concatenated optical spectrum transmission systems and methods.

In an exemplary embodiment, traffic carrying channels can be fixed to frequency/wavelength centers which are defined by sub-grid elements. Alternatively, the traffic carrying channels can float within a bin 102. This would allow an optimization of performance of these channels using arbitrary frequency spacing, while at the same time presenting a fixed range of frequency for the bin 102 to the higher level management system which is then un-encumbered of the exact frequency location of the optical carriers, except to know that they are contained within the bin 102.

In particular, the spectral diagram 100 illustrates an example of how concatenated grids may work in the concatenated optical spectrum transmission systems and methods. The spectral diagram 100 may be segmented into a plurality of bins 102 (i.e., groups, ranges, bands, etc.) of spectrum. Each of the bins 102 may occupy an equal amount of spectrum similar or equivalent to the channels in the table 30 of FIG. 2. In an exemplary embodiment, each of the bins 102 may include a granularity of spectrum which is smaller than or equal to the width of the narrowest modulated spectrum which is needed. This amount could be chosen, for instance to coincide with the smallest required roll off of the WSS 40 and any other wavelength selective component used in the system. Further, one could also use devices which have slower roll off by simply allocating multiple bins 102 to the filter guardband. Channels can then be defined by concatenating a number of these bins 102 together. If the bins 102 are enumerated, a descriptive and unique identification may be generated of a channel in this system by stating the start and stop bins 102, for example, channel 1-5 could mean the channel which occupies bins 1 through 5 inclusive.

In the exemplary spectral diagram 100, six exemplary bins 102-1-102-6 are illustrated. Those of ordinary skill in the art will recognize that an optical spectrum may include any arbitrary number of bins 102. The spectral diagram 100 includes a single group 98. A first bin 102-1 is outside the group 98 and represents allocable spectrum for another group 98 or channel. A second bin 102-2 is allocated as an unusable guardband such as the guardband 80 in the nodal configuration 70. Bins 102-3, 102-4, 102-5, 102-6 are all a part of the group 98. As described herein, channels within the group 98 do not require guardbands. Thus, in an exemplary embodiment, a coherent optical signal 104 may be provisioned in the bins 102-3, 102-4, 102-5, and the bin 102-6 may be useable spectrum for another coherent optical signal. In such a manner, the coherent optical signals 104 may be provisioned on the spectral diagram 100 with little or no unused spectrum.

Advantageously, the concatenated optical spectrum transmission systems and methods provide a mechanism for minimizing deadband allocation. The concatenated optical spectrum transmission systems and methods further allows allocating varying widths of spectrum to individual channels such that one can optimize the amount of spectrum which is used. For example, a 10 Gbaud channel and a 40 Gbaud channel can be allocated different numbers of bins, a 100 Gbaud channel can be allocated yet another different number of bins. For example, the concatenated optical spectrum transmission systems and methods enable an optical transmission system with mixed baud rate channels without a loss of spectral efficiency. In effect, the bins 102 enable flexibility in the use of the optical spectrum. That is, each channel may be provisioned to use only the spectrum it needs based on the associated modulation format. Advantageously, the concatenated optical spectrum transmission systems and methods provide a fiber optic transmission system which groups channels for the purpose of reducing or eliminating deadbands between channels. The concatenated optical spectrum transmission systems and methods further provides a fiber optic transmission system which allocates spectrum on a predetermined group of bins to create virtual channels with predictable start and end points in the optical spectrum. Furthermore, the concatenated optical spectrum transmission systems and methods allow more efficient use of optical spectrum in an optical mesh like that in the network 90 by minimizing conflicts for spectrum, and by fixing the start and stop frequencies thereby allowing a simple method to find a common set of sub-bins to bind together for a path from source to destination.

Figure 8:
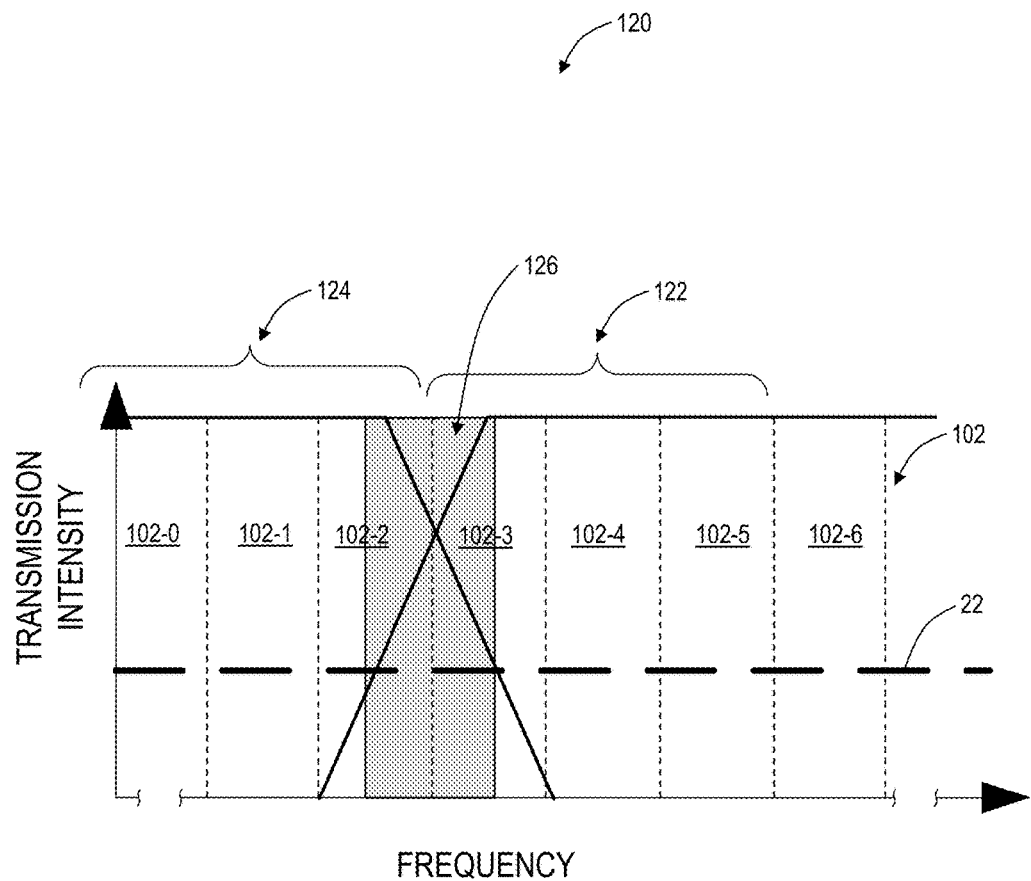
FIG. 8 is a spectral diagram of wavelength channel spacing utilizing a bin of channels with a guardband contained within bins for the concatenated optical spectrum transmission systems and methods.

Referring to FIG. 8, in an exemplary embodiment, a spectral diagram 120 illustrates wavelength channel spacing utilizing a bin of channels 102 with a guardband contained within bins 102-2, 102-3 for the concatenated optical spectrum transmission systems and methods. The spectral diagram 120 includes two coherent optical signals 122, 124. The optical signal 122 occupies the bins 102-2, 102-3, 102-4, 102-5, 102-6 and the optical signal 124 occupies the bins 102-0, 102-1, 102-2. In this exemplary embodiment, a guardband 126 is shared between the bins 102-2, 102-3. Specifically, the guardband 126 is contained within the bins 102-2, 102-3, such that the bins 102-2, 102-3 start and end at nominally the same frequency. The associated coherent receivers receiving the signals 122, 124 may be configured as such and tune accordingly.

In an exemplary embodiment, the concatenated optical spectrum transmission systems and methods may be implemented between the WSS 40, the coherent receivers 62, and a management system. The management system may include, for example, a network management system (NMS), an element management system (EMS), a network controller, a control module or processor in a network element with the coherent receiver 62, and the like. In particular, the management system may be configured with the plurality of bins 102 and associated optical signals 104, 122, 124 configured thereon. The management system variously may be utilized for operations, administration, maintenance, and provisioning (OAM&P) of an optical system. In performing such functionality, the management system may be utilized in the concatenated optical spectrum transmission systems and methods to manage the bins 102 and respective optical signals thereon with the WSS 40, the coherent receivers 62, etc.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention and are intended to be covered by the following claims.

What is claimed is:

1. A flexible grid optical transmitter communicatively coupled to an optical network, the flexible optical transmitter comprising:
a coherent optical transmitter configured to generate a signal at a respective frequency/wavelength center and spanning a plurality of bins of optical spectrum, wherein the coherent optical transmitter is tunable to generate the signal at the respective frequency and/or wavelength center with a dynamic range wide enough to generate the signal at any respective frequency and/or wavelength center in the optical spectrum,
wherein a size of each of the plurality of bins is based on a required roll off of a wavelength selective component in the optical network.

2. The flexible grid optical transmitter of claim 1, wherein a number of the plurality of bins is based on a baud rate of the signal.

3. The flexible grid optical transmitter of claim 1, wherein the respective frequency and/or wavelength center and the plurality of bins of optical spectrum are provided to the coherent optical transmitter by a management system which manages the optical spectrum as flexible spectrum.

4. The flexible grid optical transmitter of claim 1, wherein the signal utilizes any of duo-binary, quadrature amplitude modulation (QAM), differential phase shift keying (DPSK), differential quadrature phase shift keying (DQPSK), orthogonal frequency-division multiplexing (OFDM), and polarization multiplexing with any of the foregoing.

5. A flexible grid optical transceiver communicatively coupled to an optical network, the flexible optical transceiver comprising:
a coherent optical transmitter configured to generate a transmit signal at a first frequency and/or wavelength center and spanning a first plurality of bins of optical spectrum, wherein the coherent optical transmitter is tunable to generate the transmit signal at the first frequency and/or wavelength center and the coherent optical transmitter has a dynamic range wide enough to generate the signal at any frequency and/or wavelength center in the optical spectrum; and a coherent optical receiver configured to receive a receive signal at a second frequency and/or wavelength center and spanning a second plurality of bins of optical spectrum, wherein the signal utilizes any one of duobinary modulation, quadrature amplitude modulation (QAM), differential phase shift keying (DPSK), differential quadrature phase shift keying (DQPSK), and orthogonal frequency-division multiplexing (OFDM), wherein a size of each of the first plurality of bins and the second plurality of bins is based on a required roll off of a wavelength selective component in the optical network.

6. The flexible grid optical transceiver of claim 5, wherein a number of the first plurality of bins and the second plurality of bins is based on a baud rate of the transmit signal and the receive signal, respectively.

7. The flexible grid optical transceiver of claim 5, wherein the first frequency and/or wavelength center, the second frequency and/or wavelength center, the first plurality of bins, and the second plurality of bins are provided to the coherent optical transceiver by a management system which manages the optical spectrum as flexible spectrum.

8. The flexible grid optical transceiver of claim 5, wherein the coherent optical receiver is tunable to receive the receive signal at the respective frequency and/or wavelength center.

9. The flexible grid optical transceiver of claim 5, wherein the coherent optical receiver selects the receive signal from the optical spectrum while rejecting other signals present.

10. The flexible grid optical transceiver of claim 5, wherein the signal also utilizes polarization multiplexing.

* * * * *